UNITED STATES PATENT OFFICE.

WALTER S. PIERCE, OF NEW YORK, N. Y., ASSIGNOR TO EVELINA D. PIERCE, OF SAME PLACE.

PHOSPHATE FERTILIZER.

SPECIFICATION forming part of Letters Patent No. 317,010, dated May 5, 1885.

Application filed September 29, 1883. (No specimens.)

*To all whom it may concern:*

Be it known that I, WALTER S. PIERCE, a citizen of the United States, residing at the city of New York, State of New York, have invented certain new and useful Improvements in Plant Foods or Fertilizers, of which the following is a specification.

It is well known that when the phosphates of alumina and iron are treated or mixed with sulphuric acid in the usual method employed with the phosphates of lime, that the product produced is sticky and paste-like and not in a condition to be readily spread upon the soil, and such a product is unfit to be used as a fertilizer. Such a product is not marketable as a fertilizer and its condition renders it unavailable.

The object of my invention is to produce, by a new method of treatment, a material or product which can be reduced to a pulverized or powdered state, and which shall be dry and ready to be used as a fertilizer, and which can be spread easily upon the soil, and which will not absorb moisture from the air or become sticky or paste-like when fully prepared for use.

The fertilizer produced by my method contains phosphoric acid in a soluble or soluble and reverted condition, and a small proportion of the phosphoric acid contained in the fertilizer produced by my process may remain in an insoluble condition. The utility of the fertilizer so produced and the marketable condition are greatly enhanced by the process employed by me, while at the same time cheapness in the production of an exceedingly-desirable fertilizer is attained. By my process the insoluble phosphates of alumina and iron or rock or minerals containing phosphoric acid combined with alumina, or alumina and iron, or alumina, iron, and lime are so treated that the resultant product is in a good mechanical condition, and the phosphoric acid contained in the product is made available for plant food or fertilizer. I drive off the moisture contained in the phosphates of alumina and iron, or the rock or minerals containing phosphoric acid combined with alumina, or alumina and iron, or alumina, iron, or lime. These materials are ground up and the moisture can be driven off from them, either before or after they are ground, by any of the well-known methods in furnaces made for the purpose. When this moisture is driven out, I treat the ground material with sulphate of ammonia, and the object and result is to so prepare this material, by the use of sulphate of ammonia, that the fertilizer when fully prepared will remain in a dry state and not absorb moisture from the air or become sticky or paste-like; and to accomplish this I mix with this ground material sufficient quantity of sulphate of ammonia or its equivalent in a dry or dissolved state. I prefer to dissolve the sulphate of ammonia with about twice the quantity of water, and then mix with this the ground material. When these ingredients are well mixed, I treat this product with strong sulphuric acid—say about 60° to 66° Baumé, or any equivalent therefor—by mixing them together. After these are well mixed this product is thoroughly dried by a slow heat of about 125° Fahrenheit, and when thoroughly dried it is pulverized and the fertilizer is ready for use, and it will not absorb the moisture from the air, so as to become sticky or paste-like.

An example of the proportions of the ingredients used in this fertilizer would be, to one thousand pounds of ground material, two hundred pounds of sulphate of ammonia and eight hundred pounds of sulphuric acid.

I know that it is not new to manufacture fertilizers by the addition of alkaline sulphates to mineral phosphates, which, previously to such addition, have been rendered soluble by sulphuric acid; but What I do claim as new, and desire to secure by Letters Patent of the United States, is—

1. The process of manufacturing a fertilizer from the insoluble phosphates of alumina, iron, lime, and other bases, consisting of first drying and pulverizing the raw material, mixing with it a certain quantity of sulphate of ammonia, treating the mixture with strong sulphuric acid, and finally drying the product, substantially as herein described and set forth.

2. The process of manufacturing a fertilizer, consisting of first drying and pulverizing the phosphate of alumina, mixing with it a certain quantity of sulphate of ammonia, treating the mixture with strong sulphuric acid, and finally drying the product, substantially in the manner and in the proportions herein described and specified.

WALTER S. PIERCE.

Witnesses:
ANDREW WILSON,
S. P. KITTLE.